(12) United States Patent
Pan

(10) Patent No.: US 10,985,458 B2
(45) Date of Patent: Apr. 20, 2021

(54) ANTENNA APPARATUS AND TERMINAL DEVICE

(71) Applicant: Huawei Technologies Co., Ltd., Shenzhen (CN)

(72) Inventor: Xin Pan, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 16/360,739

(22) Filed: Mar. 21, 2019

(65) Prior Publication Data

US 2019/0221932 A1 Jul. 18, 2019

Related U.S. Application Data

(63) Continuation of application No. PCT/CN2017/103229, filed on Sep. 25, 2017.

(51) Int. Cl.
| | |
|---|---|
| *H01Q 3/26* | (2006.01) |
| *H01Q 3/36* | (2006.01) |
| *H01Q 15/24* | (2006.01) |
| *H01Q 13/20* | (2006.01) |
| *H01Q 11/04* | (2006.01) |
| *H04B 7/0413* | (2017.01) |
| *H01Q 1/22* | (2006.01) |
| *H01Q 5/371* | (2015.01) |

(Continued)

(52) U.S. Cl.
CPC ......... *H01Q 3/2694* (2013.01); *H01Q 1/2283* (2013.01); *H01Q 3/2605* (2013.01); *H01Q 3/36* (2013.01); *H01Q 5/371* (2015.01); *H01Q 11/04* (2013.01); *H01Q 13/206* (2013.01); *H01Q 15/242* (2013.01); *H01Q 25/005* (2013.01); *H04B 7/0413* (2013.01); *H01Q 3/24* (2013.01)

(58) Field of Classification Search
CPC .. H01Q 3/26; H01Q 5/37; H01Q 1/22; H01Q 11/04; H01Q 13/20; H01Q 15/24; H01Q 25/00; H01Q 3/24
USPC .......................................................... 343/702
See application file for complete search history.

(56) References Cited

U.S. PATENT DOCUMENTS

| | | |
|---|---|---|
| 6,362,792 B1 | 3/2002 | Sawamura et al. |
| 7,215,296 B2 | 5/2007 | Abramov et al. |
| 7,511,680 B2 | 3/2009 | Shtrom et al. |

(Continued)

FOREIGN PATENT DOCUMENTS

| | | |
|---|---|---|
| CN | 1284827 A | 2/2001 |
| CN | 1965442 A | 5/2007 |

(Continued)

*Primary Examiner* — Andrea Lindgren Baltzell
(74) *Attorney, Agent, or Firm* — Slater Matsil, LLP

(57) ABSTRACT

An antenna apparatus includes a first radiation area, a phase adjustment area and a second radiation area. The first radiation area is disposed opposite to the second radiation area. The first radiation area is connected to one end of the phase adjustment area. The other end of the phase adjustment area is connected to the second radiation area. The first radiation area includes a feeding point of the antenna apparatus. The second radiation area includes a ground point of the antenna apparatus. The phase adjustment area is used to adjust a phase of a signal fed by the feeding point, to change a direction of a space electromagnetic field formed by an electromagnetic signal radiated by each of the first radiation area and the second radiation area.

18 Claims, 5 Drawing Sheets

(51) Int. Cl.
   *H01Q 25/00*   (2006.01)
   *H01Q 3/24*   (2006.01)

(56) References Cited

U.S. PATENT DOCUMENTS

| | | | |
|---|---|---|---|
| 7,525,486 B2 | 4/2009 | Shtrom et al. | |
| 7,646,343 B2 | 1/2010 | Shtrom et al. | |
| 7,652,632 B2 | 1/2010 | Shtrom | |
| 7,675,474 B2 | 3/2010 | Shtrom et al. | |
| 7,696,946 B2 | 4/2010 | Shtrom | |
| 7,880,683 B2 | 2/2011 | Shtrom et al. | |
| 7,898,493 B1 | 3/2011 | Rojas et al. | |
| 7,965,252 B2 | 6/2011 | Shtrom et al. | |
| 8,068,068 B2 | 11/2011 | Kish et al. | |
| 8,217,843 B2 | 7/2012 | Shtrom et al. | |
| 2007/0103377 A1 | 5/2007 | Abramov et al. | |
| 2008/0094284 A1 | 4/2008 | Mei | |
| 2009/0284432 A1 | 11/2009 | Cozzolino et al. | |
| 2009/0315792 A1* | 12/2009 | Miyashita | H01Q 21/245 343/742 |
| 2010/0007567 A1* | 1/2010 | Hilgers | H01Q 9/24 343/741 |
| 2013/0342415 A1* | 12/2013 | Cozzolino | H01Q 9/42 343/821 |
| 2016/0006132 A1* | 1/2016 | Lee | H01Q 21/24 343/835 |
| 2016/0365640 A1 | 12/2016 | Minard et al. | |

FOREIGN PATENT DOCUMENTS

| | | |
|---|---|---|
| CN | 101165966 A | 4/2008 |
| CN | 101501928 A | 8/2009 |
| CN | 102067380 A | 5/2011 |
| CN | 204029975 U | 12/2014 |
| CN | 105680169 A | 6/2016 |
| CN | 106252876 A | 12/2016 |
| CN | 106602244 A | 4/2017 |
| CN | 107275765 A | 10/2017 |
| WO | 03036759 A1 | 5/2003 |

* cited by examiner

ANTENNA APPARATUS AND TERMINAL DEVICE

CROSS-REFERENCE TO RELATED APPLICATIONS

This application is a continuation of International Application No. PCT/CN2017/103229, filed on Sep. 25, 2017, the disclosure of which is hereby incorporated by reference in its entirety.

TECHNICAL FIELD

Embodiments of the present invention relate to the field of antenna technologies, and in particular, to an antenna apparatus and a terminal device.

BACKGROUND

Various communications products and technologies spring up with booming development of communications technologies. In addition, as integrated circuit technologies become increasingly mature, a product gradually tends to be light, thin, and small. A volume of an antenna that is configured to transmit and receive a signal and that is in a communications product plays an important role in obtaining a light, thin, and small communications product.

An antenna is a component configured to radiate or receive an electromagnetic wave. Usually, an antenna feature may be learned from parameters such as a radiation pattern, operation frequency, a return loss, and an antenna gain.

FIG. 1 is a schematic structural diagram of a phased array antenna in a current system. The phased array antenna adjusts a shape of a directivity pattern of a space electromagnetic field by adjusting phase beamforming of each element in different combinations in a process of arraying a plurality of radiating elements. In this solution, a plurality of phases of a plurality of array elements are adjustable, and a direction to which a maximum value of an antenna directivity pattern points is changed by using a phase control method, so as to implement beam scanning. The phased array antenna has a large body size and high costs, and consequently an array antenna cannot be applied to a terminal consumer product.

Therefore, to meet a requirement for a high throughput in a multiple-input multiple-output (MIMO) system, an antenna apparatus extremely needs to be developed in a design structure with a single feeding point, to provide an antenna having a simple structure, a small volume, low costs, and an adjustable space electromagnetic field direction.

SUMMARY

Embodiments of the present invention provide an antenna apparatus and a terminal device, so as to manufacture an antenna having a simple structure, a small volume, low costs, and an adjustable space electromagnetic field direction, to facilitate market use.

According to a first aspect, an embodiment of the present invention provides an antenna apparatus. The antenna apparatus includes an antenna body. The antenna body includes a first radiation area, a second radiation area, and a phase adjustment area. One end of the phase adjustment area is connected to the first radiation area. The other end of the phase adjustment area is connected to the second radiation area. The first radiation area includes a first radiation section and a feeding point. The second radiation area includes a second radiation section and a ground point. The phase adjustment area is used to adjust a phase of a signal fed by the feeding point, to change a direction of a space electromagnetic field formed by an electromagnetic signal radiated by each of the first radiation section and the second radiation section. The feeding point of the antenna apparatus is a part connected to a signal source on a circuit board of a terminal device. The ground point of the antenna apparatus is a part connected to a ground plane on the circuit board.

According to this embodiment of the present invention, the phase adjustment area in the antenna apparatus can be used to adjust the phase of the signal fed by the feeding point of the antenna apparatus, to adjust the direction of the space electromagnetic field formed by the electromagnetic signal radiated by each of the first radiation area and the second radiation area in the antenna apparatus, that is, change a distribution pattern of the space electromagnetic field, so that spatial multi-color coverage is implemented, and a throughput of a communications system is finally increased. Herein, the spatial multi-color coverage also indicates various directions of the space electromagnetic field. In addition, if a communications device performs data communication using a plurality of antennas, the spatial multi-color coverage may also reduce an envelope correlation coefficient (ECC) between the plurality of antennas. In addition, the antenna apparatus in this application has a simple structure, a small volume, and low costs, to facilitate market use.

In an implementation, the antenna apparatus further includes an antenna debug circuit. A first output end of the antenna debug circuit is connected to the feeding point, a second output end of the antenna debug circuit is connected to the ground point, and the antenna debug circuit is configured to adjust the phase, an amplitude, or a frequency of the signal fed by the feeding point, so as to change the direction and/or strength of the space electromagnetic field formed by the electromagnetic signal radiated by each of the first radiation section and the second radiation section.

According to this embodiment of the present invention, a radio frequency port of the terminal device may transmit a signal to the antenna debug circuit. The antenna debug circuit adjusts a phase, an amplitude, or a frequency of the signal, and then transmits the adjusted signal to the first radiation area and the second radiation area in the antenna apparatus, to adjust the direction and/or strength of the space electromagnetic field formed by the electromagnetic signal radiated by each of the first radiation area and the second radiation area in the antenna apparatus, that is, change a distribution pattern of the space electromagnetic field, so that spatial multi-color coverage is implemented, and a throughput of a communications system is finally increased.

In an implementation, the phase adjustment area includes a first section, a second section, and a third section that are successively connected, an end that is of the first section and that is far away from the second section is connected to the first radiation area, and an end that is of the third section and that is far away from the second section is connected to the second radiation area.

In an implementation, both the first section and the third section are of a straight-line shape, and are disposed opposite to each other. To be specific, the phase adjustment area is of a "⊐" shape.

In an implementation, a width of the first section is different from a width of the third section, so as to adjust a phase of a signal in the phase adjustment area and reduce a radiation capability of a transmission line.

In an implementation, the first radiation section includes a first connection section and N bending sections, one end of the first connection section is connected to one end of the phase adjustment area, the other end of the first connection section is connected to the N bending sections, the N bending sections are bent from an end that is of the first connection section and that is far away from the phase adjustment area, and N is a positive integer.

In an implementation, each of the N bending sections includes at least one connection section that is successively connected, and directions of any two adjacent connection sections in the at least one connection section are different, to generate space electromagnetic fields in different directions.

In an implementation, the second radiation section includes a second connection section and M bending sections. One end of the second connection section is connected to the other end of the phase adjustment area. The other end of the second connection section is connected to the M bending sections. The M bending sections are bent from an end that is of the second connection section and that is far away from the phase adjustment area. M is a positive integer.

In an implementation, each of the M bending sections includes at least one connection section that is successively connected, and directions of any two adjacent connection sections in the at least one connection section are different, to generate space electromagnetic fields in different directions.

In an implementation, directions of any two adjacent radiation sections in N radiation sections are perpendicular to each other.

In an implementation, directions of any two adjacent radiation sections in M radiation sections are perpendicular to each other.

In an implementation, the antenna debug circuit includes any one of the following: a phase adjustable device, a right-to-left rotation switcher, a microstrip, a non-standard impedance transmission line, a power amplifier, and a phase shifter.

In an implementation, the phase adjustment area is a balun having a phase adjustment function.

In an implementation, the antenna body may be configured as a Wireless Fidelity (Wi-Fi) antenna, or may be configured as a Bluetooth (BT) antenna.

According to a second aspect, an embodiment of the present invention provides a terminal device, including the antenna apparatus according to any one of the foregoing implementations. The antenna apparatus is applied to the terminal device, thereby helping the terminal device set a development requirement for size miniaturization.

In conclusion, in the embodiments of the present invention, the phase adjustment area in the antenna apparatus is used to adjust the phase of the signal fed by the feeding point of the antenna apparatus, to adjust oscillating current strength distribution areas of the first radiation area and the second radiation area in the antenna apparatus to form different induction near-field distributions, that is, change a distribution pattern of the space electromagnetic field, so that spatial multi-color coverage is implemented, and a throughput of a communications system is finally increased. Herein, the spatial multi-color coverage also indicates various directions of the space electromagnetic field. In addition, if a communications device performs data communication by using a plurality of antennas, the spatial multi-color coverage may also reduce an ECC between the plurality of antennas. In addition, the antenna apparatus in this application is of a structure with a single feeding point, and has a simple structure, a small volume, and low costs, to facilitate market use.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The following describes the embodiments of the present invention with reference to the accompanying drawings in the embodiments of the present invention.

The embodiments of the present invention provide an antenna apparatus applied to a terminal device. The terminal device may be a set-top box, a router, a tablet computer, a mobile phone, or the like. The terminal device usually includes a plurality of different functions, such as a Wi-Fi function and a Bluetooth (BT) function. A plurality of antennas may be disposed in the terminal device, and respectively correspond to different function modules for signal transmission, for example, a Wi-Fi antenna and a BT antenna. A layout of the antenna apparatus, provided in the embodiments of the present invention, in the terminal device can change a direction of a space electromagnetic field, and improve throughput performance of a communications system.

Figure 1:
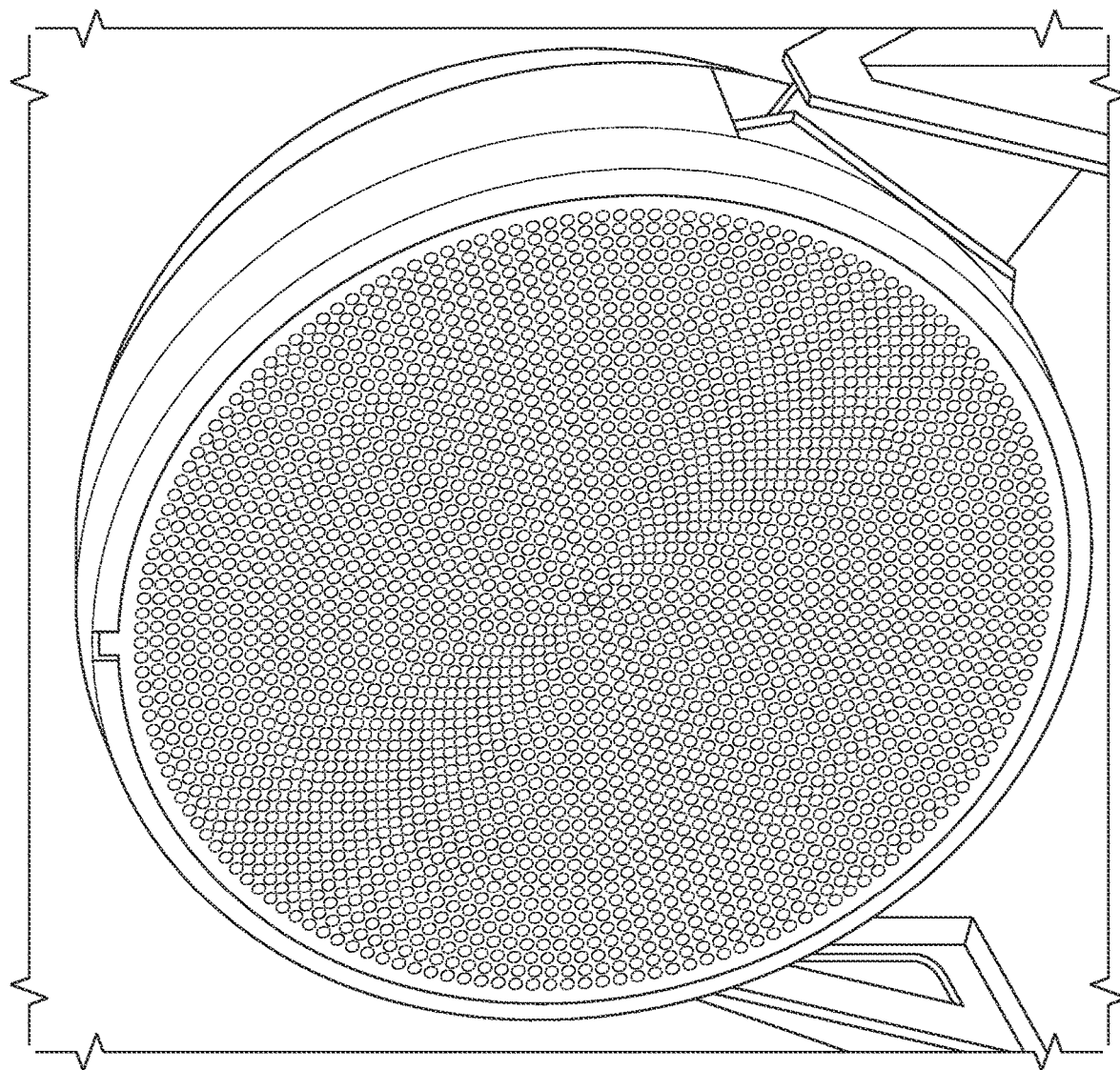
FIG. 1 is a schematic structural diagram of a phased array antenna in the prior art.
Figure 2:
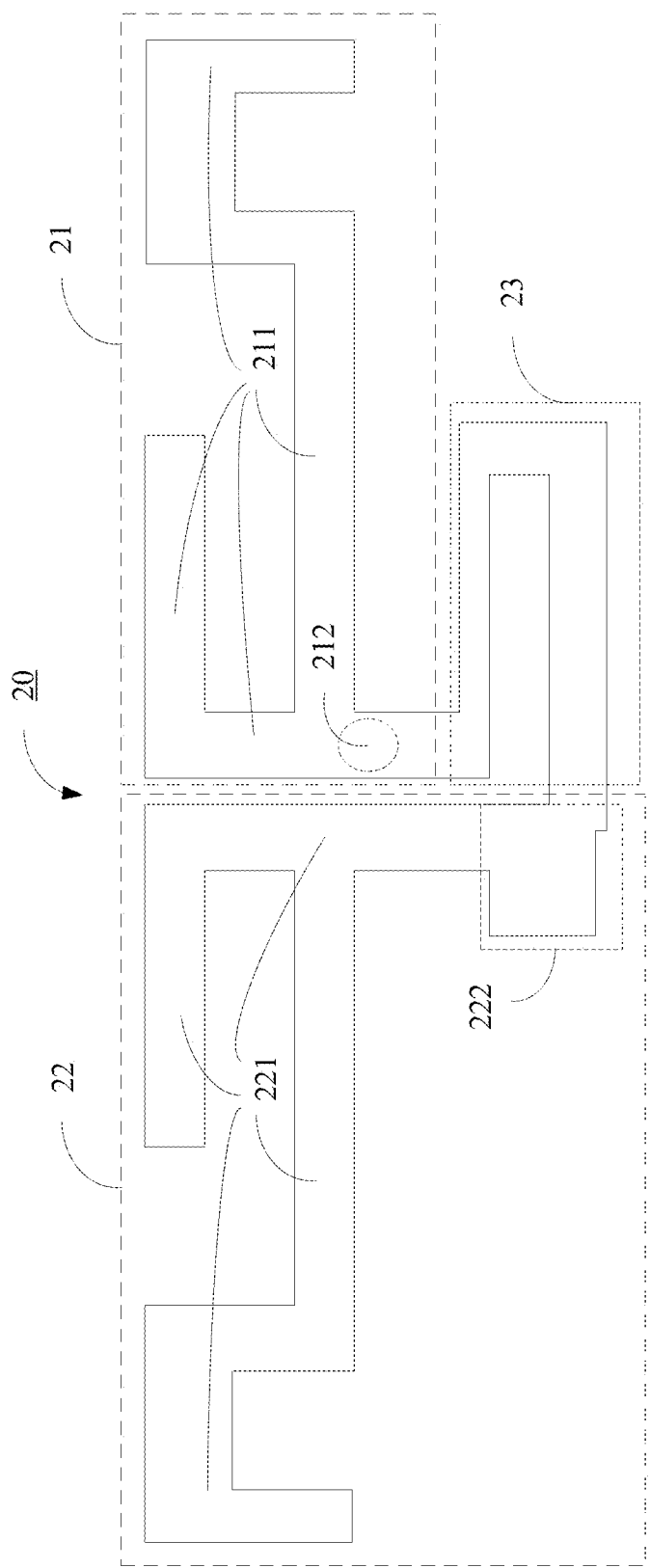
FIG. 2 is a schematic structural diagram of an antenna body according to an embodiment of the present invention.

FIG. 2 is a schematic structural diagram of an antenna body according to an embodiment of the present invention. An antenna apparatus includes an antenna body 20. The antenna body 20 includes a first radiation area 21, a second radiation area 22, and a phase adjustment area 23. The phase adjustment area 23 is connected between the first radiation area 21 and the second radiation area 22. The first radiation area 21 includes a first radiation section 211 and a feeding point 212. The second radiation area 22 includes a second radiation section 221 and a ground point 222. The phase adjustment area 23 is used to adjust a phase of a signal fed by the feeding point 212, so as to change a direction of a space electromagnetic field formed by an electromagnetic signal radiated by each of the first radiation section 211 and the second radiation section 221. It should be noted that the antenna body 20 in this embodiment of the present invention may be a conducting wire layout on a circuit board. In FIG. 2, a white shadow part is the antenna body 20 which is consisted of the conducting wire surrounding the circuit board. Other parts that are surrounded by the conducting wire and in the first radiation area 21 except the feeding point 212 may be considered as the first radiation section 211, and other parts that are surrounded by the conducting wire and in the second radiation area 22 except the ground point 222 may be considered as the second radiation section 221.

Figure 3:
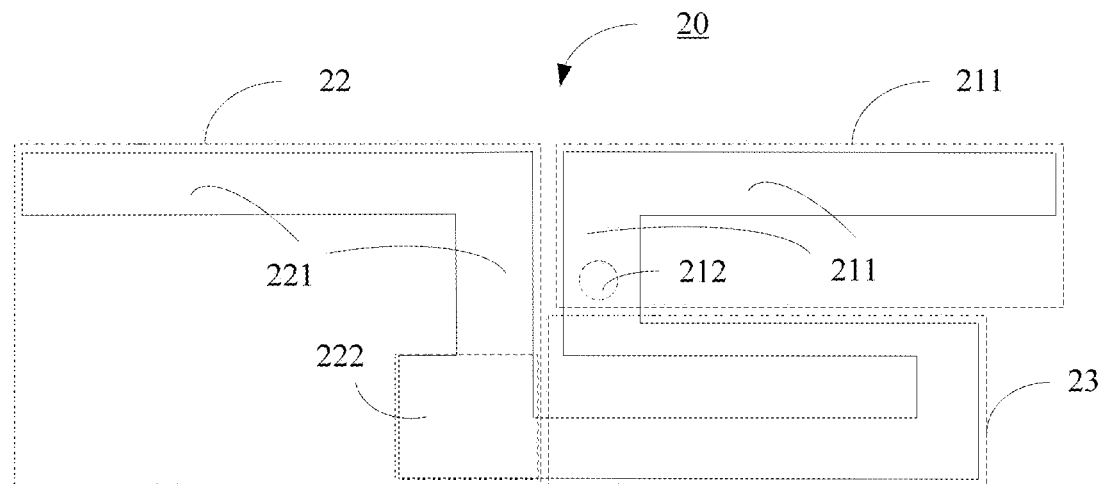
FIG. 3 is a schematic structural diagram of another antenna body according to an embodiment of the present invention.

In this embodiment of the present invention, shapes of the first radiation area 21, the second radiation area 22, and the phase adjustment area 23 are not limited, and the first radiation area 21, the second radiation area 22, and the phase adjustment area 23 may be of a straight-line shape, a bent shape, or another shape. FIG. 2 is merely used as an example, and does not limit the shapes of the first radiation area 21, the second radiation area 22, and the phase adjustment area 23. For example, alternatively, the shapes of the first radiation area 21, the second radiation area 22, and the phase adjustment area 23 may be shown in FIG. 3.

The feeding point 212 may be disposed at a junction between the first radiation area 21 and the phase adjustment area 23, or may be disposed in another area in the first radiation area 21. This embodiment of the present invention imposes no specific limitation. Similarly, the ground point 222 may be disposed at a junction between the second radiation area 22 and the phase adjustment area 23, or may be disposed in another area in the second radiation area 22. This embodiment of the present invention imposes no specific limitation.

The first radiation area 21 is disposed opposite to the second radiation area 22. For example, the first radiation area 21 and the second radiation area 22 respectively extend to two opposite directions, to enable the radiation areas to obtain a larger electromagnetic field clearance area in limited space, to improve radiation efficiency of the antenna body.

The phase adjustment area 23 may be a phase-shift balun having a phase adjustment function, and change density distributions of an excitation current on the first radiation section 211 and the second radiation section 221 by affecting current distributions on the first radiation section 211 and the second radiation section 221 by changing the phase of the signal, to finally change the direction of the space electromagnetic field.

The antenna apparatus may be arranged on the circuit board of a terminal device. The circuit board may be a mainboard of the terminal device, and the circuit board is provided with an antenna layout area that may be used to arrange the antenna body 20 in this embodiment of the present invention.

Optionally, the antenna apparatus further includes an antenna debug circuit 30. A first output end of the antenna debug circuit 30 is connected to the feeding point 212 of the antenna apparatus, and a second output end of the antenna debug circuit 30 is connected to the ground point 222 of the antenna apparatus. The antenna debug circuit 30 is configured to adjust the phase, an amplitude, or a frequency of the signal fed by the feeding point 212, so as to change the direction of the space electromagnetic field formed by the electromagnetic signal radiated by each of the first radiation section 211 and the second radiation section 221. Specifically, the first output end of the antenna debug circuit 30 is connected to the feeding point 212 of the antenna apparatus using a core wire of a coaxial cable, and is equivalent to a positive feeding point for the signal. The second output end of the antenna debug circuit 30 is connected to the ground point 222 of the antenna apparatus using an outer envelope body of the coaxial cable, and is equivalent to a negative feeding point for the signal.

Figure 4:
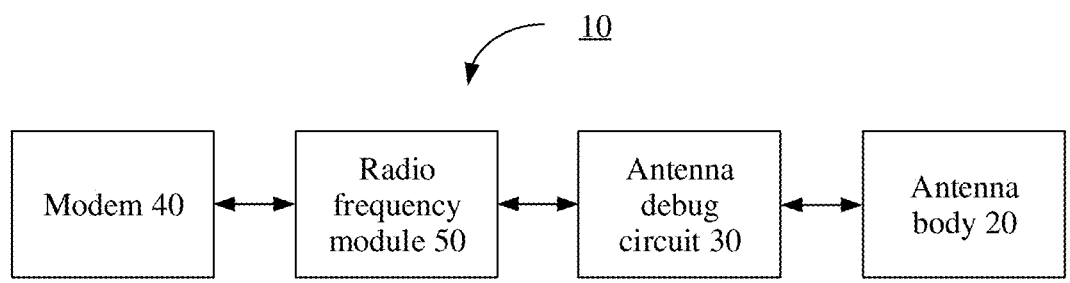
FIG. 4 is a schematic structural diagram of a terminal device according to an embodiment of the present invention.

For example, referring to FIG. 4, FIG. 4 is a schematic structural diagram of a terminal device according to an embodiment of the present invention. A terminal device 10 includes but is not limited to a modem 40, a radio frequency module 50, the antenna debug circuit 30, and the antenna body 20. All these apparatuses may be distributed on a circuit board of the terminal device. The modem 40 is configured to: modulate a to-be-transmitted baseband signal, or decode a received baseband signal. Specifically, during transmission, a radio frequency signal is compiled into baseband code used for transmission; and during receiving, received baseband code is decoded into a radio frequency signal. In addition, the modem 40 is responsible for compiling address information (a mobile number or a website address), text information (an SMS message text or a website text), and picture information. The radio frequency module 50 is configured to: enhance a signal obtained after modulation or demodulation, and feed back the signal to an antenna. The antenna debug circuit 30 is configured to adjust a phase, an amplitude, or a frequency of the signal. The antenna body 20 is configured to: convert the signal into an electromagnetic wave, and radiate the electromagnetic wave to space, so that a communications peer end receives the electromagnetic wave. It should be noted that, if the terminal device 10 includes a plurality of antenna bodies, a plurality of antenna debug circuits 30 and a plurality of radio frequency modules are required, one radio frequency module is connected to one antenna debug circuit, and one antenna debug circuit is connected to one antenna body. For a connection manner, refer to the foregoing description. Details are not repeatedly described herein.

Before transmitting the signal to the antenna body 20, the antenna debug circuit 30 may first process the signal, for example, adjust the phase, the amplitude, or the frequency of the signal. After processing, the antenna debug circuit 30 then transmits the signal to the antenna body 20 by using the feeding point 212, to finally change the direction and/or strength of the space electromagnetic field formed by the electromagnetic signal radiated by each of the first radiation section 211 and the second radiation section 221. For example, the antenna debug circuit 30 may adjust the phase of the signal, to finally change the direction of the space electromagnetic field formed by the electromagnetic signal radiated by each of the first radiation section 211 and the second radiation section 221. Alternatively, the antenna debug circuit 30 may adjust the amplitude of the signal, to finally change the strength of the space electromagnetic field formed by the electromagnetic signal radiated by each of the first radiation section 211 and the second radiation section 221.

A specific structure of the phase adjustment area 23 is as follows.

Figure 5:
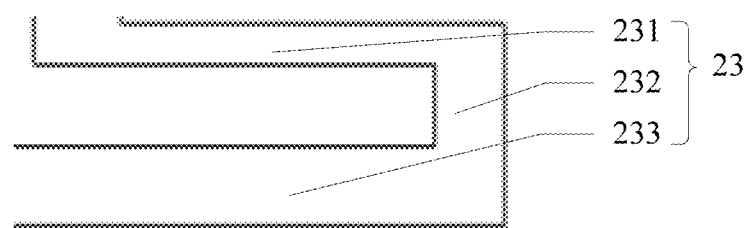
FIG. 5 is a schematic structural diagram of a phase adjustment area in the antenna body shown in FIG. 2.

In an implementation, referring to FIG. 5, the phase adjustment area 23 includes a first section 231, a second section 232, and a third section 233 that are successively connected, an end that is of the first section 231 and that is far away from the second section 232 is connected to the first radiation area 21, and an end that is of the third section 233 and that is far away from the second section 232 is connected to the second radiation area 22. In FIG. 5, both the first section 231 and the third section 233 are of a straight-line shape, and are disposed opposite to each other. In this implementation, the phase adjustment area 23 is of a "⊃" shape. In another implementation, the phase adjustment area 23 may not be limited to the "⊃" shape. For example, the phase adjustment area 23 may be of a straight-line shape, a "∪" shape, or another shape, provided that the feeding point 212, the phase adjustment area 23, and the ground point 222 can form a path.

In an implementation, a width of the first section 231 is different from a width of the third section 233, so as to adjust a phase of a signal in the phase adjustment area and reduce a radiation capability of a transmission line. A reason is that a link whose characteristic frequency impedance features do not match has a weakest space radiation capability.

A specific structure of the first radiation section 211 is as follows.

Figure 6:
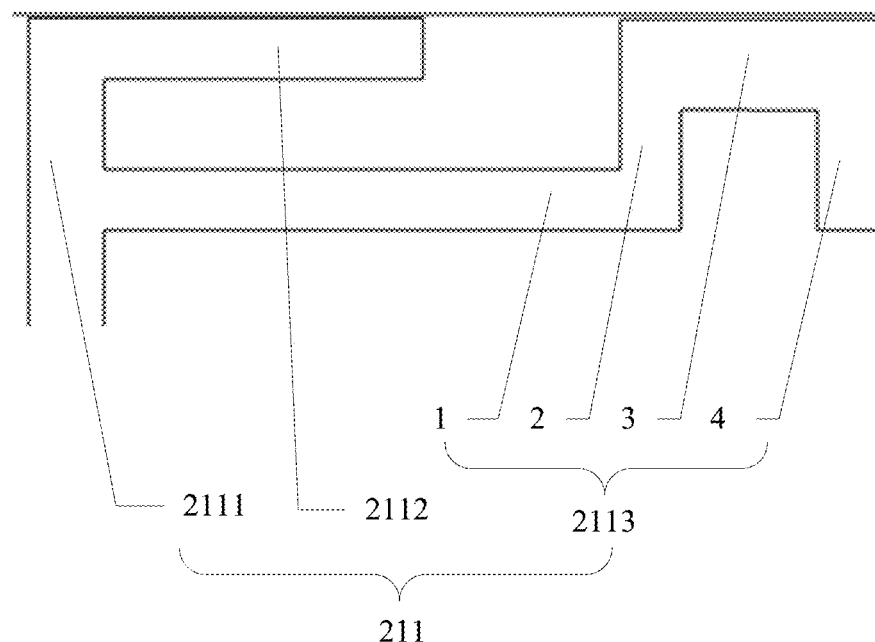
FIG. 6 is a schematic structural diagram of a first radiation section in the antenna body shown in FIG. 2.

In an implementation, the first radiation section 211 includes a first connection section and N bending sections, one end of the first connection section is connected to one end of the phase adjustment area 23, the other end of the first connection section is connected to the N bending sections, the N bending sections are bent from an end that is of the first connection section and that is far away from the phase adjustment area 23, and N is a positive integer. In this embodiment of the present invention, an example in which the first radiation section 211 includes a first connection section 2111, a bending section 2112, and a bending section 2113 is used for description. As shown in FIG. 6, the bending section 2112 is shorter than the bending section 2113. Because a longer radiation arm indicates a lower frequency, a frequency of a signal radiated by the bending section 2112 is higher than a frequency of a signal radiated by the bending section 2113. For example, the frequency of the signal radiated by the bending section 2112 is 5G, and the frequency of the signal radiated by the bending section 2113 is 2.4G. Therefore, it can be learned that the antenna body 20 may be a dual-band antenna.

In an implementation, each of the N bending sections includes at least one connection section that is successively connected, and directions of any two adjacent connection sections in the at least one connection section are different, to generate space electromagnetic fields in different directions. In an implementation, the directions of any two adjacent connection sections in the at least one connection section are perpendicular to each other. Therefore, an included angle between directions of space electromagnetic fields formed by electromagnetic signals radiated by any two adjacent connection sections is 45 degrees. Alternatively, the directions of any two adjacent connection sections in the at least one connection section may be at another angle to each other. This embodiment of the present invention imposes no specific limitation.

Figure 7:
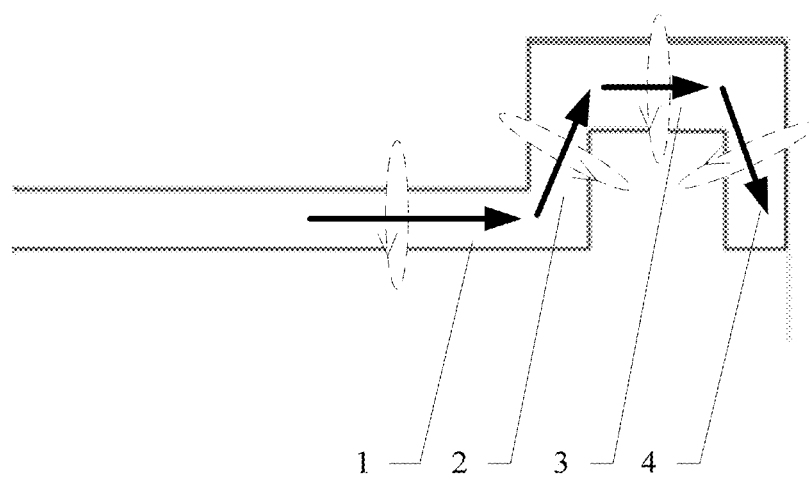
FIG. 7 is a schematic diagram of an electromagnetic field direction according to an embodiment of the present invention.

As shown in FIG. 6, the bending section 2112 includes only one connection section, and the connection section is of a straight-line shape. The bending section 2113 includes four connection sections that are successively connected: a connection section 1, a connection section 2, a connection section 3, and a connection section 4. A direction of the connection section 1 is a horizontal direction, a direction of the connection section 2 is a vertical direction, a direction of the connection section 3 is a horizontal direction, and a direction of the connection section 4 is a vertical direction. Referring to FIG. 7, if a current flows from the connection section 1 to the connection section 4, based on an Ampere's law, a direction of a space electromagnetic field formed when the current flows through the connection section 1 is a counterclockwise direction on a vertical plane; a direction of a space electromagnetic field formed when the current flows through the connection section 2 is a counterclockwise direction on a plane, where an included angle between the plane and the vertical plane is 45 degrees; a direction of a space electromagnetic field formed when the current flows through the connection section 3 is a counterclockwise direction on a vertical plane; and a direction of a space electromagnetic field formed when the current flows through the connection section 4 is a counterclockwise direction on a plane, where an included angle between the plane and the vertical plane is 45 degrees. To be specific, an included angle between the directions of the space electromagnetic fields formed by the current in the connection section 1 and the connection section 2 is 45 degrees, an included angle between the directions of the space electromagnetic fields formed by the current in the connection section 2 and the connection section 3 is 45 degrees, and an included angle between the directions of the space electromagnetic fields formed by the current in the connection section 3 and the connection section 4 is 45 degrees. Therefore, a direction of a space electromagnetic field formed by the current in the bending section 2113 includes a plurality of directions, thereby improving a throughput of a communications system.

A specific structure of the second radiation section 221 is as follows.

Figure 8:
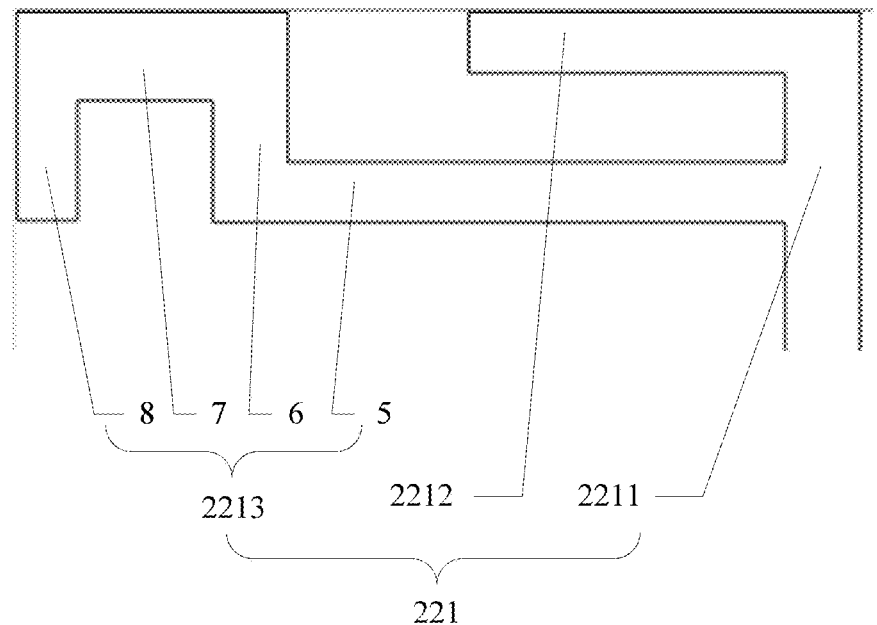
FIG. 8 is a schematic structural diagram of a second radiation section in the antenna body shown in FIG. 2.

In an implementation, the second radiation section 221 includes a second connection section and M bending sections, one end of the second connection section is connected to the other end of the phase adjustment area 23, the other end of the second connection section is connected to the M bending sections, the M bending sections are bent from an end that is of the second connection section and that is far away from the phase adjustment area 23, and M is a positive integer. In this embodiment of the present invention, an example in which the second radiation section 221 includes a second connection section 2211, a bending section 2212, and a bending section 2213 is used for description. As shown in FIG. 8, the bending section 2212 is shorter than the bending section 2113. Because a longer radiation arm indicates a lower frequency, a frequency of a signal radiated by the bending section 2212 is higher than a frequency of a signal radiated by the bending section 2213. For example, the frequency of the signal radiated by the bending section 2212 is 5G, and the frequency of the signal radiated by the bending section 2213 is 2.4G.

In an implementation, each of the M bending sections includes at least one connection section that is successively connected, and directions of any two adjacent connection sections in the at least one connection section are different, so as to generate space electromagnetic fields in different directions. In an implementation, the directions of any two adjacent connection sections in the at least one connection section are perpendicular to each other. Therefore, an included angle between directions of space electromagnetic fields formed by electromagnetic signals radiated by any two adjacent connection sections is 45 degrees. Alternatively, the directions of any two adjacent connection sections in the at least one connection section may be at another angle to each other. This embodiment of the present invention imposes no specific limitation.

Figure 9:
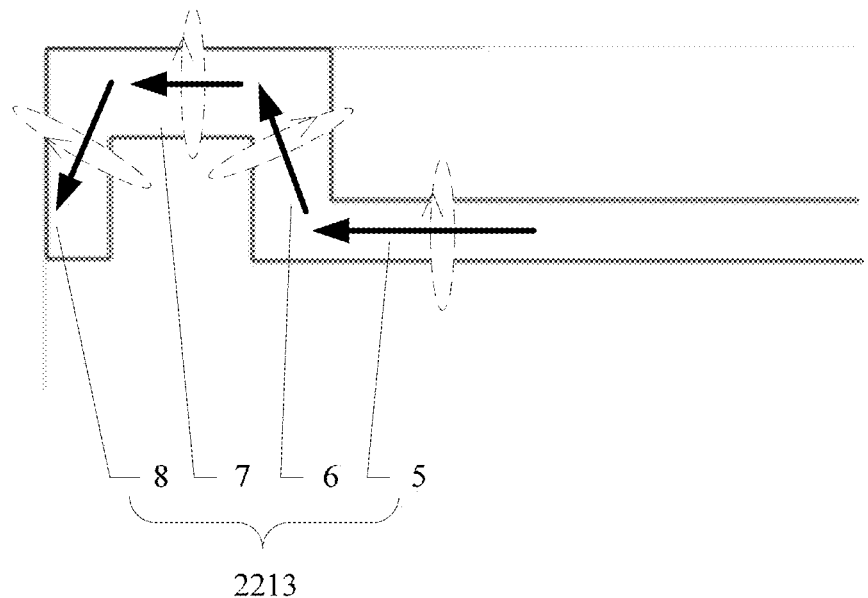
FIG. 9 is a schematic diagram of another electromagnetic field direction according to an embodiment of the present invention.

As shown in FIG. 8, the bending section 2212 includes only one connection section, and the connection section is of a straight-line shape. The bending section 2213 includes four connection sections that are successively connected: a connection section 5, a connection section 6, a connection section 7, and a connection section 8. A direction of the connection section 5 is a horizontal direction, a direction of the connection section 6 is a vertical direction, a direction of the connection section 7 is a horizontal direction, and a direction of the connection section 8 is a vertical direction. Referring to FIG. 9, if a current flows from the connection section 5 to the connection section 8, based on an Ampere's law, a direction of a space electromagnetic field formed when the current flows through the connection section 5 is a clockwise direction on a vertical plane; a direction of a space electromagnetic field formed when the current flows through the connection section 6 is a clockwise direction on a plane, where an included angle between the plane and the vertical plane is 45 degrees; a direction of a space electromagnetic field formed when the current flows through the connection section 7 is a clockwise direction on a vertical plane; and a direction of a space electromagnetic field formed when the current flows through the connection section 8 is a clockwise direction on a plane, where an included angle between the plane and the vertical plane is 45 degrees. To be specific, an included angle between the directions of the space electromagnetic fields formed by the current in the connection section 5 and the connection section 6 is 45 degrees, an included angle between the directions of the space electromagnetic fields formed by the current in the connection section 6 and the connection section 7 is 45 degrees, and an included angle between the directions of the space electromagnetic fields formed by the current in the connection section 7 and the connection section 8 is 45 degrees. Therefore, a direction of a space electromagnetic field formed by the current in the bending section 2213 includes a plurality of directions, thereby improving a throughput of a communications system.

In an implementation, the antenna debug circuit 30 includes any one of the following: any circuit that can change an ECC, such as a phase adjustable device, a right-to-left rotation switcher, a microstrip, a non-standard impedance transmission line, a power amplifier, and a phase shifter.

The antenna apparatus provided in this embodiment of the present invention is applied to the terminal device, thereby helping the terminal device set a development requirement for size miniaturization.

In addition, the terminal device may further optimize a location layout of the antenna apparatus in a product based on the envelope correlation coefficient ECC, so as to improve antenna ECC performance.

The antenna apparatus in this embodiment of the present invention may be applied to a multi-antenna terminal device. The ECC is an antenna correlation. The antenna correlation is usually divided into two types: an envelope correlation and a signal correlation. The signal correlation is a correlation between complex signals received from different antennas, and the envelope correlation is a correlation between amplitudes for receiving different signals. The ECC is a normalized value in terms of a value. "1" indicates a complete correlation, and in a physical concept, indicates that distributions of electromagnetic fields of two antennas in space are completely equivalent. "0" is an ideal ECC value. To be specific, two antennas are completely uncorrelated.

In a calculation method, the ECC may be calculated by using the following formula in a dual-antenna condition.

$$\rho_e = \frac{\left|\iint 4\pi[\overrightarrow{F_1}(\theta,\varphi), \overrightarrow{F_2}(\theta,\varphi)] d\Omega\right|^2}{\iint 4\pi\left|\overrightarrow{F_1}(\theta,\varphi)\right|^2 d\Omega \iint 4\pi\left|\overrightarrow{F_2}(\theta,\varphi)\right|^2 d\Omega}$$

A meaning of the formula is as follows: An envelope correlation coefficient $\rho_e$ is approximation comparison performed between a space field on which dual antennas jointly act and both a space field formed when an antenna 1 excites an antenna 2 to load a 50Ω load and a space field formed when the antenna 2 excites the antenna 1 to load a 50Ω load.

It is found from the study that the ECC in a dual-antenna solution may be approximately considered as:

$$\rho_e = \frac{|S_{11}*S_{12} + S_{22}*S_{21}|^2}{(1-|S_{11}^2|-|S_{12}^2|)(1-|S_{22}^2|-|S_{21}^2|)}$$

After an antenna layout is optimized based on a related principle, an RTL8192 chip is introduced as a power board, and a group of comparison data is made by using a conventional external high-gain whip antenna and the antenna apparatus provided in this embodiment of the present invention. Testing is performed by using a horizontal rotary table, and the terminal device is horizontally rotated as the horizontal rotary table is horizontally rotated through 360° with a step of 30°. A TX&RX uplink-downlink rate of the terminal device is checked in a rotation process. A result shows that performance of a throughput is increased by 10% at each angle after the external high-gain whip antenna disposed on a demo board is replaced with the antenna apparatus. An inverse matrix bluff packet loss problem that exists in an original algorithm is completely resolved in the antenna solution.

In conclusion, according to the embodiments of the present invention, the phase adjustment area in the antenna apparatus is used to adjust the phase of the signal fed by the feeding point of the antenna apparatus, so as to adjust the direction of the space electromagnetic field formed by the electromagnetic signal radiated by each of the first radiation area and the second radiation area in the antenna apparatus, that is, change a distribution pattern of the space electromagnetic field, so that spatial multi-color coverage is implemented, and a throughput of a communications system is finally increased. Herein, the spatial multi-color coverage also indicates various directions of the space electromagnetic field. In addition, if a communications device performs data communication by using a plurality of antennas, the spatial multi-color coverage may also reduce an ECC between the plurality of antennas. In addition, the antenna apparatus in this application has a simple structure, a small volume, and low costs, to facilitate market use.

What is claimed is:

1. An antenna apparatus, comprising an antenna body, wherein the antenna body comprises:
    a first radiation area, comprising a first radiation section and a feeding point;
    a second radiation area, comprising a second radiation section and a ground point; and
    a phase adjustment area, wherein the phase adjustment area is connected between the first radiation area and the second radiation area, and the phase adjustment area is configured to adjust a phase of a signal fed by the feeding point, to change a direction of a space electromagnetic field formed by an electromagnetic signal radiated by each of the first radiation section and the second radiation section.

2. The antenna apparatus according to claim 1, wherein the antenna apparatus further comprises an antenna debug circuit, wherein a first output end of the antenna debug circuit is connected to the feeding point, a second output end of the antenna debug circuit is connected to the ground point, and the antenna debug circuit is configured to adjust the phase, an amplitude, or a frequency of the signal fed by the feeding point, wherein the adjustment of the phase, the amplitude, or the frequency of the signal fed by the feeding point changes the direction or strength of the space electromagnetic field formed by the electromagnetic signal radiated by each of the first radiation section and the second radiation section.

3. The antenna apparatus according to claim 2, wherein the antenna debug circuit comprises: a phase adjustable device, a right-to-left rotation switcher, a microstrip, a non-standard impedance transmission line, a power amplifier, or a phase shifter.

4. The antenna apparatus according to claim 1, wherein the phase adjustment area comprises a first section, a second section, and a third section that are successively connected, wherein a first end of the first section is connected to the first radiation area, and the first end of the first section is physically remote from the second section, and wherein a first end of the third section is connected to the second radiation area, and the first end of the third section is physically remote from the second section.

5. The antenna apparatus according to claim 4, wherein a width of the first section is different from a width of the third section, and wherein the first section and the third section are configured to adjust a phase of a signal in the phase adjustment area and reduce a radiation capability of a transmission line.

6. The antenna apparatus according to claim 1, wherein the first radiation section comprises a first connection section and N bending sections, a first end of the first connection section is connected to a first end of the phase adjustment area, a second end of the first connection section is connected to the N bending sections, the N bending sections are bent from a third end of the first connection section, the third end of the first connection section is physically remote from the phase adjustment area, and N is a positive integer.

7. The antenna apparatus according to claim 6, wherein the third end of the first connection section is the same as the first end of the first connection section or the second end of the first connection section.

8. The antenna apparatus according to claim 7, wherein each of the N bending sections comprises a respective connection section, the respective connection section of each of the N bending sections are successively connected to each other, and directions of any two adjacent connection sections are different, and wherein the N bending sections are configured to generate space electromagnetic fields in different directions.

9. The antenna apparatus according to claim 1, wherein the second radiation section comprises a second connection section and M bending sections, a first end of the second connection section is connected to a first end of the phase adjustment area, a second end of the second connection section is connected to the M bending sections, the M bending sections are bent from a third end of the second connection section, the third end of the second connection section is physically remote from the phase adjustment area, and M is a positive integer.

10. The antenna apparatus according to claim 9, wherein the third end of the second connection section is the same as the first end of the second connection section or the second end of the second connection section.

11. The antenna apparatus according to claim 9, wherein each of the M bending sections comprises a connection section, the respective connection section of each of the M bending sections are successively connected to each other, and directions of any two adjacent connection sections are different, and wherein the M bending sections are configured to generate space electromagnetic fields in different directions.

12. A terminal device, comprising an antenna apparatus, wherein the antenna apparatus comprises an antenna body, and wherein the antenna body comprises:
 a first radiation area, comprising a first radiation section and a feeding point;
 a second radiation area, comprising a second radiation section and a ground point; and
 a phase adjustment area, wherein the phase adjustment area is connected between the first radiation area and the second radiation area, and the phase adjustment area is configured to adjust a phase of a signal fed by the feeding point, to change a direction of a space electromagnetic field formed by an electromagnetic signal radiated by each of the first radiation section and the second radiation section.

13. The terminal device according to claim 12, wherein the antenna apparatus further comprises an antenna debug circuit, wherein a first output end of the antenna debug circuit is connected to the feeding point, a second output end of the antenna debug circuit is connected to the ground point, and the antenna debug circuit is configured to adjust the phase, an amplitude, or a frequency of the signal fed by the feeding point, wherein the adjustment of the phase, the amplitude, or the frequency of the signal fed by the feeding point changes the direction or strength of the space electromagnetic field formed by the electromagnetic signal radiated by each of the first radiation section and the second radiation section.

14. The terminal device according to claim 13, wherein the antenna debug circuit comprises: a phase adjustable device, a right-to-left rotation switcher, a microstrip, a non-standard impedance transmission line, a power amplifier, or a phase shifter.

15. The terminal device according to claim 12, wherein the phase adjustment area comprises a first section, a second section, and a third section that are successively connected, wherein a first end of the first section is connected to the first radiation area, and the first end of the first section is physically remote from the second section, and wherein a first end of the third section is connected to the second radiation area, and the first end of the third section is physically remote from the second section.

16. The terminal device according to claim 15, wherein a width of the first section is different from a width of the third section, and wherein the first section and the third section are configured to adjust a phase of a signal in the phase adjustment area and reduce a radiation capability of a transmission line.

17. The terminal device according to claim 12, wherein the first radiation section comprises a first connection section and N bending sections, a first end of the first connection section is connected to a first end of the phase adjustment area, a second end of the first connection section is connected to the N bending sections, the N bending sections are bent from a third end of the first connection section, the third end of the first connection section is physically remote from the phase adjustment area, and N is a positive integer.

18. The terminal device according to claim 17, wherein the third end of the first connection section is the same as the first end of the first connection section or the second end of the first connection section.

* * * * *